US012592515B2

(12) United States Patent
Yu et al.

(10) Patent No.: US 12,592,515 B2
(45) Date of Patent: Mar. 31, 2026

(54) HIGH VOLTAGE INTERLOCK BYPASS CONNECTOR

(71) Applicant: FCA US LLC, Auburn Hills, MI (US)

(72) Inventors: Huiyang Yu, Shanghai (CN); Jingjing Zhao, Shanghai (CN); Caizhen Sun, Shanghei (CN); Cuicui Zhang, Shanghai (CN); Min Yang, Shanghai (CN); Weisi Gu, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 323 days.

(21) Appl. No.: 18/338,769

(22) Filed: Jun. 21, 2023

(65) Prior Publication Data

US 2024/0429655 A1 Dec. 26, 2024

(51) Int. Cl.
*H01R 13/629* (2006.01)
*H01R 13/53* (2006.01)

(52) U.S. Cl.
CPC ....... *H01R 13/62961* (2013.01); *H01R 13/53* (2013.01); *H01R 2201/26* (2013.01)

(58) Field of Classification Search
CPC .. H01R 13/62961; H01R 13/53; H01R 31/08; H01R 31/085; H01R 2201/26
USPC .................................... 439/157, 511, 620.33
See application file for complete search history.

(56) References Cited

U.S. PATENT DOCUMENTS 1,947,798 A * 2/1934 Reinhardt ................ F21S 4/10 439/511
4,059,320 A * 11/1977 Piaget .................... H01R 31/08 439/511
4,884,050 A * 11/1989 Kozel ................ H01H 85/0417 337/264
4,945,872 A * 8/1990 Embry .................. B60R 25/045 439/511
7,641,499 B1 * 1/2010 George ................. B60L 3/0069 439/352
8,083,533 B2 * 12/2011 De Chazal ........... H01R 13/648 200/51.09
8,192,227 B2 * 6/2012 Gentner ................. H01R 13/70 200/51.06
8,460,027 B2 * 6/2013 Topolewski ........... H01R 31/08 439/511
8,979,577 B2 * 3/2015 Wu ...................... H01R 9/2491 439/507
10,511,121 B2 * 12/2019 Milroy ............... H01R 13/5221
10,608,364 B2 * 3/2020 Blakborn ............... H01R 13/44
10,955,487 B2 * 3/2021 Hemnani ............. H01R 13/701

(Continued)

*Primary Examiner* — Gary F Paumen
(74) *Attorney, Agent, or Firm* — Jeremy J. Klobucar

(57) ABSTRACT

A high voltage interlock bypass connector for use with a female high voltage connector having an interlock is provided and includes a metal connector pin having a substantially U-shape with a connected end and a pair of terminal ends; and a handle formed around and enclosing the connected end of the connector pin opposite the terminal ends such that the terminal ends extend beyond the handle. The handle is configured to provide insulation from a voltage carried by the metal pin and is transparent such that the connected end of the metal pin enclosed by the handle is visible within the handle. The interlock bypass connector is configured to be inserted into the interlock to complete a high voltage interlock circuit without having to connect a corresponding male high voltage connector having integrated interlock pins.

5 Claims, 3 Drawing Sheets

(56) References Cited

U.S. PATENT DOCUMENTS

| | | | | |
|---|---|---|---|---|
| 2011/0195587 | A1* | 8/2011 | De Chazal | H01R 13/648<br>439/188 |
| 2012/0072048 | A1* | 3/2012 | Gentner | H01R 31/08<br>701/1 |

* cited by examiner

HIGH VOLTAGE INTERLOCK BYPASS CONNECTOR

FIELD

The present application relates generally to high voltage connectors and, more particularly, to a high voltage interlock bypass connector for use with a high voltage connector assembly associated with a high voltage circuit, such as in an electrified vehicle.

BACKGROUND

In high voltage circuits for electrified vehicles, there is typically a high voltage interlock function incorporated into the high voltage connectors. When the mating male and female high voltage connectors are decoupled or open, the interlock circuit will be open and this can typically be detected by a vehicle's battery management system. When this happens, the battery management system will prevent the high voltage circuit from closing for charging or discharging the battery pack. While this works well for vehicles, in a battery pack test environment, various high voltage connectors often remain open and not connected to the high voltage load. As a result, the high voltage interlock circuit will be open, which prevents testing of battery pack under high voltage load. In an effort to overcome this situation, test facilities often have to stock various different mating male high voltage connectors for use with the various different high voltage female connectors utilized in different high voltage system products, which is expensive, requires storage space and is inefficient. Thus, there remains a need for improvement in the relevant art.

SUMMARY

In accordance with an exemplary aspect of the invention, a high voltage connector assembly for use in a high voltage circuit associated with a high voltage source includes: a female connector coupled to one of a high voltage source and a high voltage load, where the female connector includes high voltage electrical pin receiving wells and a high voltage interlock having interlock pin receiving wells; a male connector configured to be electrically coupled to the other of the high voltage source and high voltage load, where the male connector is configured to matingly couple to the female connector. The male connector includes high voltage pins configured to be received in the high voltage electrical pin receiving wells; and interlock pins configured to be received in the interlock pin receiving wells. The assembly further includes a male high voltage interlock bypass connector separate and distinct from the male connector and configured to be selectively received in the interlock pin receiving wells in place of the male connector for use in completing a high voltage interlock circuit without coupling the male connector to the female connector.

In some implementations, the high voltage interlock bypass connector includes a handle at one end and two pin ends extending therefrom and configured to be received in the interlock pin receiving wells in place of the female connector.

In some implementations, the high voltage interlock bypass connector comprises a continuous wire pin in the form of a U-shape, and a connected end of the U-shaped wire is positioned within and is encapsulated by the handle.

In some implementations, the handle is translucent and the connected end of the U-shaped wire within the handle is visible from outside of the handle.

In some implementations, the handle is sized and shaped to have an outer shape complimentary to and configured to be received within a receptacle of the female connector surrounding the high voltage interlock pin receiving wells.

In accordance with another example aspect of the invention, a high voltage interlock bypass connector for use with a female high voltage connector having an interlock port includes: a continuous metal connector pin having a substantially U-shape with a connected end and a pair of terminal ends; and a handle formed around and enclosing the connected end of the metal connector pin opposite the pair of terminal ends such that the terminal ends extend beyond the handle. The handle is configured to provide insulation from a voltage carried by the metal pin and is transparent such that the connected end of the metal pin enclosed by the handle is visible within the handle. The high voltage interlock bypass connector is adapted to be inserted into the interlock port to complete a high voltage interlock circuit without having to connect a corresponding male high voltage connector having integrated interlock pins.

In some implementations, the handle is sized and shaped to have an outer shape complimentary to and adapted to be received within a receptacle of the female connector surrounding the high voltage interlock pin receiving wells.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there remains a need for improvement in the art of high voltage connectors and, in particular, for closing or bypassing the interlock in the high voltage connector in a proper, efficient and cost-effective manner for regular testing of various different high voltage systems for electrified vehicles.

The high voltage interlock connection feature in high voltage mating connectors associated with electrified vehicles is part of a high voltage interlock loop (HVIL) associated with a high voltage system in the electrified vehicle. The HVIL typically utilizes a continuous slow voltage loop that monitors all high voltage connectors and components in the electrified vehicle. If the low voltage signal is interrupted, such as if the mating interlock pins of a male high voltage connector are removed from the interlock receiving wells in the high voltage female connector, this indicates a potential issue with the high voltage system. When the HVIL circuit is interrupted, a diagnostic code is typically triggered and detected by the electrified vehicle's battery management system, which then displays an alert or alarm and prevents the high voltage circuit from closing for charging or discharging of the battery. The battery management system, in one example implementation, includes at least one controller or control system.

As previously discussed, electrified vehicle high voltage systems typically include numerous high voltage connectors for various different products associated with the high voltage systems. During testing of such high voltage systems in a test environment, various high voltage connectors remain open and thus the HVIL circuit is interrupted or open, which prevents testing of the high voltage system under load. Existing approaches to this situation are inefficient and expensive. Currently, testing of such high voltage systems typically requires maintaining a supply of mating connectors with interlock pins (e.g., the male high voltage mating connector) for each and every different high voltage female connector style utilized in the high voltage system to be tested. Such a workaround is expensive, requires monitoring and maintaining of various different connector styles, and is inefficient.

Accordingly, a high voltage connector interlock bypass connector has been developed for use in testing high voltage systems under load. This high voltage interlock bypass connector includes a standalone male bypass connector that can be provided as part of a high voltage connector system or provided individually for use with various different high voltage connectors having interlock features. The male bypass connector eliminates the need to have the more expensive male high voltage connectors readily available for each different style of high voltage connector assembly used in the high voltage system to be tested.

Figure 1:
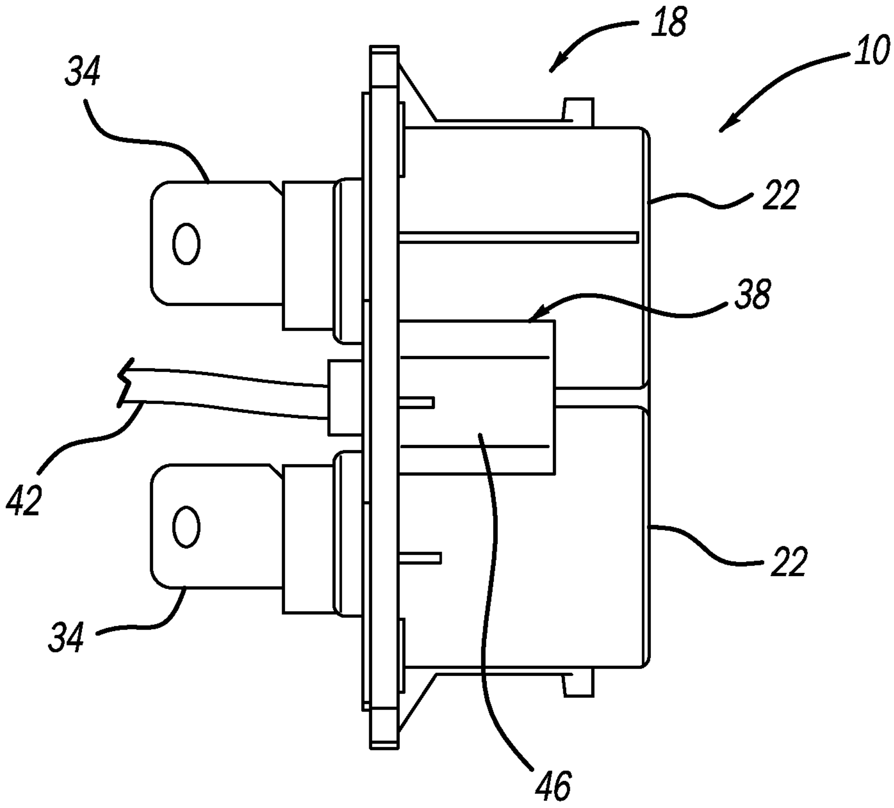
FIG. 1 is a view of a mating female connector of a high voltage connector assembly having an interlock feature with interlock pin receiving wells coupled to a high voltage interlock loop (HVIL) according to the principles of the present disclosure.
Figure 2:
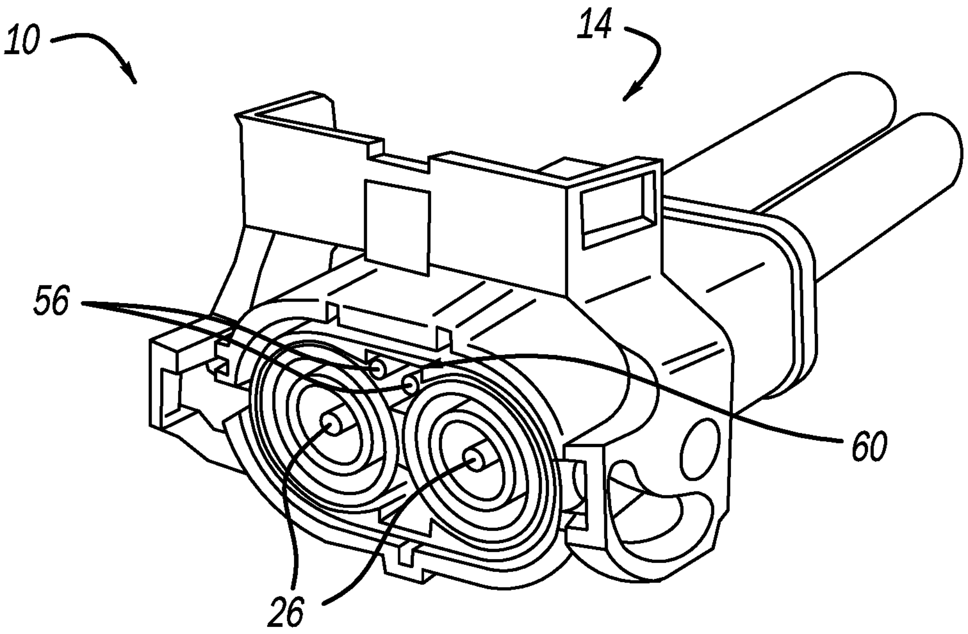
FIG. 2 is a view of a mating male connector of the high voltage connector assembly having male interlock pins according to the principles of the present disclosure.
Figure 3:
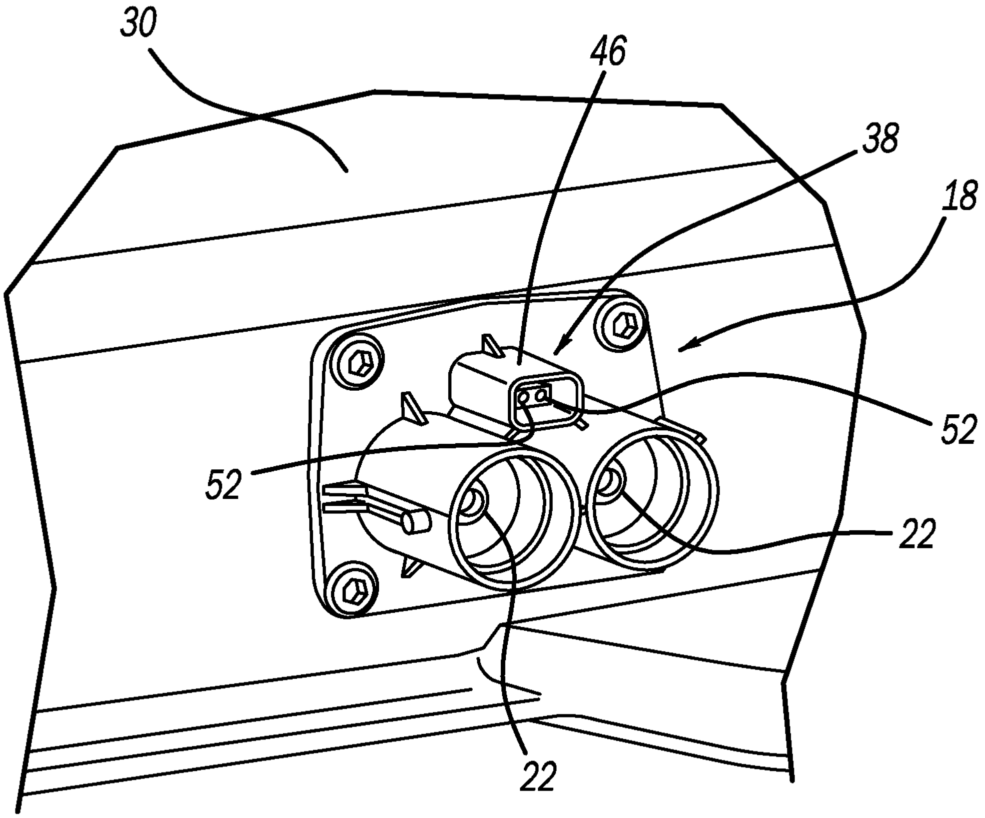
FIG. 3 is a view of the high voltage mating female connector of FIG. 1 coupled to a high voltage battery pack according to the principles of the present disclosure.

Referring now to FIGS. 1-3, a high voltage connector assembly is generally identified at reference numeral 10. The high voltage connector assembly 10 includes mating male and female high voltage connectors 14, 18, respectively. In the example connector assembly 10 illustrated, the high voltage female connector 18 includes high voltage terminal or pin receiving wells 22 that are configured to receive the positive and negative pins/terminals 26 of the mating high voltage male connector 14. The female high voltage connector 18 can be coupled to various high voltage components, including a high voltage battery or battery pack 30 via terminals 34. FIG. 3 shows the high voltage connector 18 coupled to an exemplary battery pack 30.

The female high voltage connector 18 also includes an interlock feature 38. The interlock feature is electrically coupled to the high voltage interlock loop (HVIL) partially shown via electrical connection 42. The high voltage interlock 38 includes, in the example shown, an outer housing portion 46 and internal interlock female pin receiving wells 52 configured to receive the corresponding interlock pins 56 of male high voltage connector 14. As discussed above, when the male and female high voltage connectors 14, 18 are matingly coupled together, the interlock pins 56 of male connector 14 are received in interlock receiving wells 52 of female connector 18, which provides continuity of the HVIL through high voltage connector 10.

The mating male connector 14, in addition to the features discussed above, includes a housing feature 60 configured to (sized and shaped to) accommodate the size and shape of interlock housing portion 46 of high voltage female connector 18. In the test environment discussed above, each interlock 38 of the female high voltage connectors 18 in the high voltage system being tested will need to be closed to support the testing. As there are various different styles of high voltage connectors available and utilized in the same high voltage system, various different mating male high voltage connectors 14 need to be modified and maintained in stock for use in coupling to their associated female high voltage connector 14 to close the HVIL to support the testing.

Figure 4:
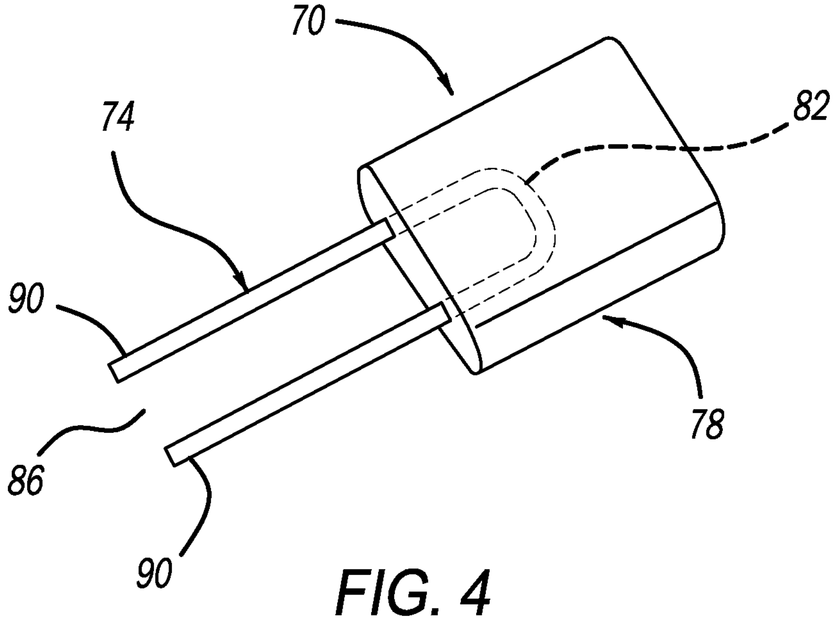
FIG. 4 is a view of an example male interlock bypass connector according to the principles of the present disclosure.
Figure 5:
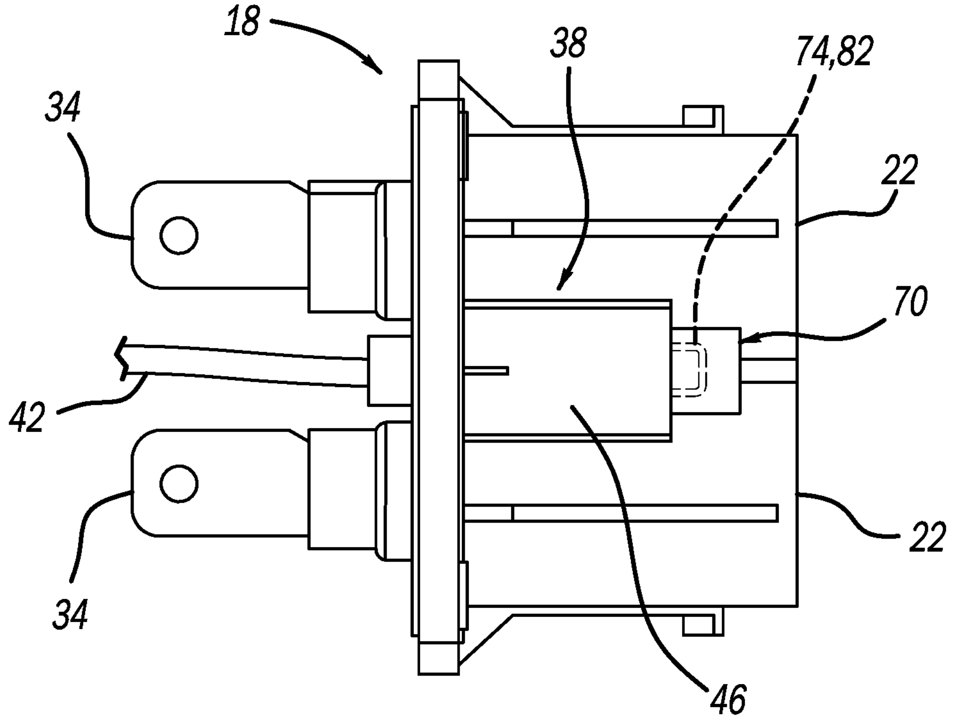
FIG. 5 is a view of the example male interlock bypass connector of FIG. 4 received in the interlock receiving wells of the mating female high voltage connector of FIG. 1 according to the principles of the present disclosure.
Figure 6:
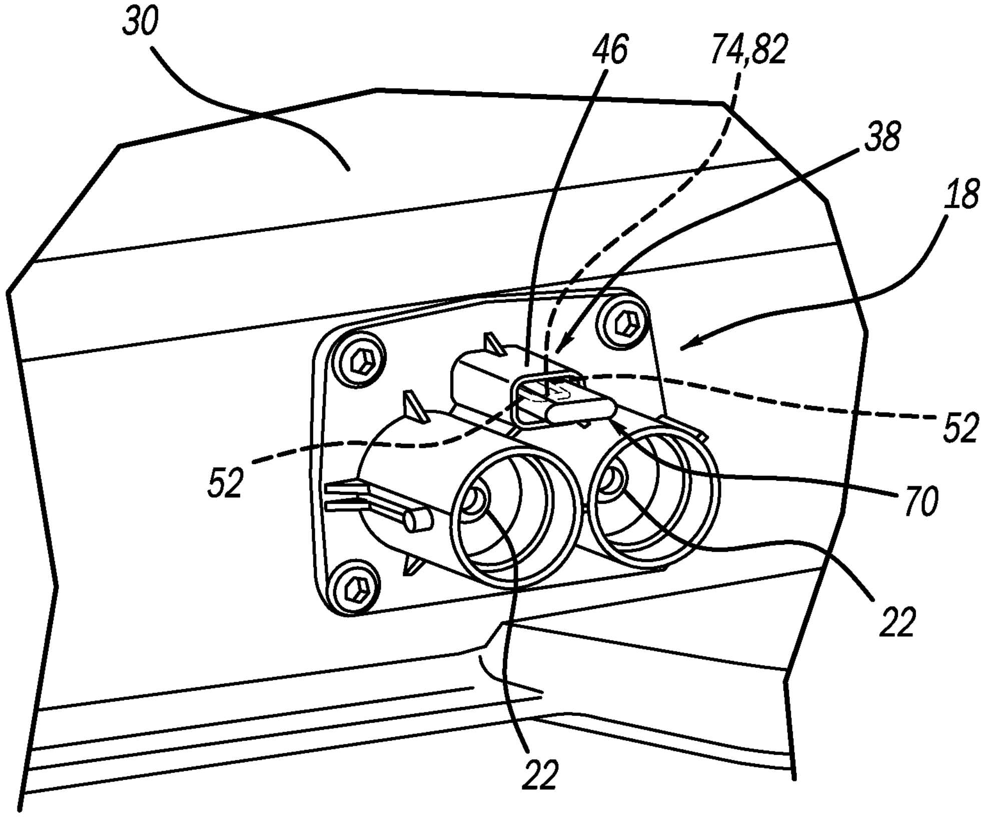
FIG. 6 is a view of the example male interlock bypass connector of FIG. 4 received in the interlock receiving wells of the mating female high voltage connector coupled to the battery pack according to the principles of the present disclosure.

Turning now to FIGS. 4-6 and with continuing reference to FIGS. 1-3, the high voltage interlock bypass connector 70 will now be discussed in greater detail. The interlock bypass connector 70 is designed for use in closing the HVIL in place of (i.e., without a need for) the mating male high voltage connector 18 being coupled to female high voltage connector 14. In the example illustrated, the interlock bypass connector 70 includes an interlock metal component 74 and a handle 78. The interlock metal component 74 can be in the form of a continuous U-shaped wire or pin 74 having a connected end 82 and an open end 86 in the example form of two pins 90. In one example implementation, the wire 74 forming the pins 90 complies with applicable standards for diameter and spacing of the pins 90 form each other so as to be universally applicable to interlocks 38 of high voltage connector assemblies 10 following the applicable interlock standards.

In the example interlock bypass connector 70 illustrated, the handle 78 forms one end 94 of the bypass connector 70 and terminal ends of pins 90 form the other, opposite end of bypass connector 70. The handle 78 is designed and configured to perform multiple functions. The handle 78 is sized and shaped to be large enough for a user to manipulate the interlock bypass connector 70 without having to touch the exposed portions of the U-shaped wire 74 that form pins 90. The handle 78 is also sized and shaped and formed of a suitable material, such as plastic, to insulate a user holding the handle from voltage in the wire 74 from the HVIL circuit when the interlock bypass connector 70 is inserted into the receiving pin wells 52 of interlock 38.

The handle 78, in the example illustrated, is formed around and/or encapsulates the connected end 82 of wire 74. The handle 78 can also be translucent such that the connected end 82 of wire 74 encapsulated by handle 78 can be visible or seen within handle 78 from an external viewpoint. This feature serves the function of being able to visibly inspect the connected end 82 of wire 74 to ensure that it is in fact connected and there is not a discontinuity, such as from a manufacturing or assembly defect. In some situations, this feature is helpful to assist in diagnosing an unknown source of discontinuity in the HVIL by inspecting the interlock bypass connector 70 while it is/remains inserted in or coupled to interlock 38. This can avoid the need to have to remove and replace interlock bypass connector 70 to check its continuity, such as if it had an opaque handle 78.

In operation, in a test or similar environment where the high voltage battery 30 and/or the high voltage system of an electrified vehicle is to be tested, the interlock bypass connector 70 can be inserted into interlock 38 for each and every open high voltage female connector 18. In this manner, modified mating male connectors 14 having interlock pins 56 are not required to be utilized to close the HVIL circuit for each and every such high voltage female connector. FIGS. 5 and 6 illustrate the interlock bypass connector 70 inserted into the pin receiving wells 52 of interlock 38 of female high voltage connector 14.

It will be appreciated that the term "controller" or "control system" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A high voltage connector assembly for use in a high voltage circuit associated with a high voltage source, the high voltage connector assembly comprising:

a female connector coupled to one of a high voltage source and a high voltage load, the female connector including high voltage electrical pin receiving wells and a high voltage interlock having interlock pin receiving wells;

a male connector configured to be electrically coupled to the other of the high voltage source and high voltage load, the male connector configured to matingly couple to the female connector and including:

high voltage pins configured to be received in the high voltage electrical pin receiving wells; and interlock pins configured to be received in the interlock pin receiving wells; and a male high voltage interlock bypass connector separate and distinct from the male connector and configured to be selectively received in the interlock pin receiving wells in place of the male connector for use in completing a high voltage interlock circuit without coupling the male connector to the female connector.

2. The high voltage connector assembly of claim 1, wherein the high voltage interlock bypass connector includes a handle at one end and two pin ends extending therefrom and configured to be received in the interlock pin receiving wells of the female connector.

3. The high voltage connector assembly of claim 2, wherein the high voltage interlock bypass connector comprises a continuous wire pin in the form of a U-shape, and wherein a connected end of the U-shaped wire is positioned within and encapsulated by the handle.

4. The high voltage connector assembly of claim 3, wherein the handle is translucent and the connected end of the U-shaped wire within the handle is visible from outside of the handle.

5. The high voltage connector assembly of claim 2, wherein the handle is sized and shaped to have an outer shape complimentary to and configured to be received within a receptacle of the female connector surrounding the high voltage interlock pin receiving wells.

* * * * *